Feb. 26, 1929.　　　　　　　　　　　　　1,703,421
F. P. HABICHT
PANTOGRAPHIC MACHINE TOOL
Filed Nov. 17, 1925
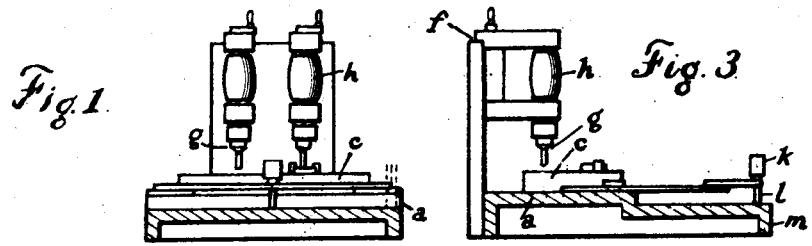
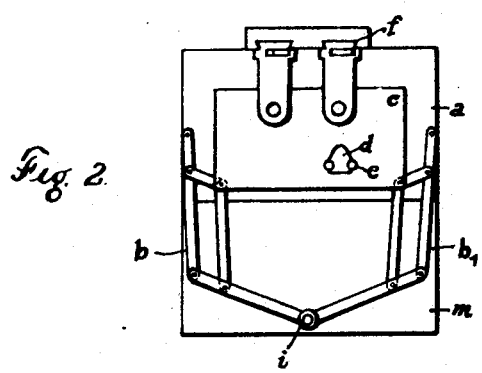
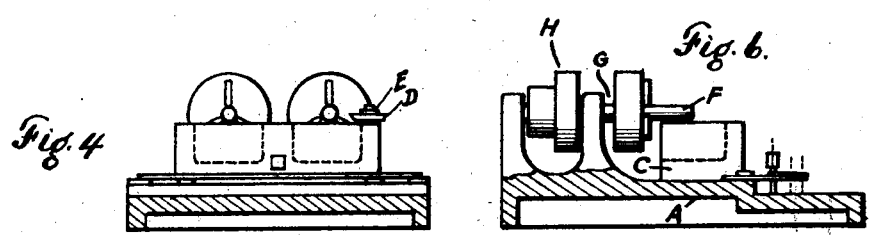
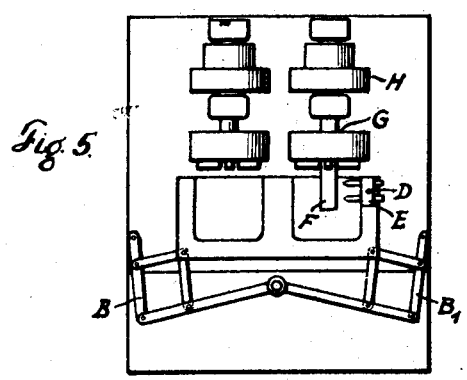
INVENTOR:
Franz Paul Habicht
BY: Reege, Boyne & Bachelor
ATTORNEYS.

Patented Feb. 26, 1929.

1,703,421

UNITED STATES PATENT OFFICE.

FRANZ PAUL HABICHT, OF SCHAFFHAUSEN, SWITZERLAND.

PANTOGRAPHIC MACHINE TOOL.

Application filed November 17, 1925, Serial No. 69,619, and in Switzerland November 20, 1924.

Pantographic machine tools are known with which the tool, for instance an engraving tool, is controlled by the pantograph and is driven by cords and cord pulleys. Such machines which are mostly used for engraving are not suitable for heavy duty. The reason is that the joints of the pantograph as well as the links of the latter are subject to vibrations. An accurate milling of plane surfaces is scarcely possible owing to the suspended joints of the pantograph, i. e. as it is very difficult to align the joints so that they are exactly parallel to each other.

The machine tool according to the present invention overcomes these drawbacks and presents moreover the following advantages: The fact that the plurality of pantographs, which replace the hitherto used single pantograph, cause a parallel guidance in a similar manner as a cross sliding table provides for the possibilities which are otherwise only inherent to machines having cross sliding tables. Multiple spindle machines may be used and copying devices of the known type may be employed.

The arrangement of the machine is as follows:

Two plain plates, one sliding upon the other, are provided the plane of which is substantially horizontal. For instance the upper plate may slide on the lower plate and may be pressed against the latter by its weight. One of the plates is controlled by two pantographs which have the same ratio and one steering point common to both. The pantographs and their operative connecting points for instance on the upper plate are so arranged that during a movement of the steering point along a curve the controlled plate carries out parallel movements so that with a certain movement of the steering point each point of the plate moves on a curve similar to the afore mentioned curve and that the movement of the plate effects the control of the machining performed on at least one blank.

Opposite the plate, spindles may be arranged provided with gripping devices adapted to fix rotary cutters or blanks to be turned, which may be rotated by belts, electric motors and the like. The plate itself may support gripping devices by means of which blanks to be milled, lathe tools, screw cutters and the like may be fixed to the plate. In case the present pantographic machine tool is used as a milling machine one or more milling spindles with substantially vertical axes may be provided. They may be adjustable in height by means of known slides guided in supports.

In using the machine tool as a lathe one or more spindles with substantially horizontal axes may be arranged. For special purposes, for instance in the application as a turning and milling machine both types of the positions of the spindles or intermediate positions may be used.

Two constructional examples, one referring to a milling machine and the other to a turning lathe, shall now be described. Figs. 1, 2 and 3 illustrate the milling machine in elevation, plan view and end view respectively, and Figs. 4, 5 and 6 are views similar to Figs. 1, 2 and 3 respectively, but illustrating a lathe.

On the stationary horizontal plate $a$ the plate $c$ controlled by the pantographs $b$ and $b^1$ slides; blanks $d$ may be secured to the plate $c$ by the gripping device $e$. The pantographs $b$ and $b^1$ have the steering point $i$ common to both, in which a separate operating handle $k$ is provided. Above the plate $c$ the milling spindles $g$ are mounted in adjustable slides $f$. The spindles are rotated by the belt drive $h$. The adjustment of the height of the milling spindles may be made in a known manner by means of a vernier or a micrometer disc. The operating handle $k$ of the pantographs is arranged above a table $m$ on which drawings or templates may be fixed. In the present example it is assumed that the machine has to perform milling work. In order to avoid errors and to attain the greatest accuracy the pantographs $b$ and $b^1$ have only one ratio whilst in case of the machine being used as an engraving machine several ratios are preferably used. The plate $c$ is comparatively heavy. It also has a very large surface with which to bear on the lower stationary plate. By means of a small amount of oil or grease pressed in between the two plates the latter adhere strongly to each other and in spite of the large weight an easy movement is ensured. When the pantograph steering point is guided along a curve the centre of the end mill will describe a similar curve on the plate $c$ but on a different scale. The accuracy with which the milling is performed depends on the rigidity of the links of the pantograph and on the clearance in the joints as well as on the magnitude of the vibrations which the movement of the milling spindle transmits to these parts. The large weight of the plate $c$ ensures that these vibrations are scarcely noticed at the steering point. It is easy to keep the clearance in the joints below three hundredths of a millimetre and it is therefore easily possible to attain a lateral accuracy of the present machine tool of less than one tenth of one millimetre. A proper mounting of the milling spindle $g$ is of vital importance and it may be attained for instance by utilizing amply dimensioned ball bearings. The obtainable accuracy in depth depends practically only on the heating and on the clearance in the bearings of the milling spindle $g$. It may be easily kept within one hundredth of one millimetre. As may be seen from the drawings with the machine illustrated two blanks may be simultaneously machined. However, more than two spindles may be arranged without departing from the principle of the present invention.

In the structure shown in Figs. 4, 5 and 6, A denotes a stationary horizontal plate on which the plate C can be displaced by means of the pantographs B and B¹. On the plate C various tools D are fixed by means of the gripping devices E. Opposite the plate C turning spindles G having blanks F fixed to them are arranged. The lathe spindles are driven by the belt drive H. All the other parts correspond to those illustrated in Figs. 1, 2 and 3. As will be seen from the drawings such a pantograph lathe replaces a two spindle turret lathe. It is, however, more stable and cheaper. Curved blanks may easily be machined, for instance handles for tools and machine tools.

As the two pantographs with their common steering point permit the plate C to carry out parallel movements and guide the latter as if the plate were sliding in a cross slide, obviously both types of machine tools, i. e. the lathe as well as the milling machine, may be utilized as copying machines in a known manner. Thereby the advantage presents itself that instead of two controlling levers, which are necessary with the known copying machines, the operation of the steering point of the pantograph may be performed by a single handle. When copying, the pantographs may be used as parallel guides and as mechanisms causing the movement whilst the control may be effected in a known manner by a feeler pin and a specimen work piece.

The novel machine may obviously be also used as a grinding machine.

Claims:

1. A pantographic machine tool, comprising a pair of plates of substantially heavy weight one slidable upon the other, a pair of equally proportioned pantographs pivotally connected to said plates and adapted to operate said slidable plate, and a common steering member for operating said pantographs in unison, the organization being such that any movement of the steering member is duplicated by the slidable plate.

2. A pantographic machine tool, comprising a pair of plates of substantially heavy weight one slidable upon the other, a pair of equally proportioned pantographs pivotally connected to said plates and adapted to operate said slidable plate, a common steering member for operating said pantographs in unison, the organization being such that any movement of the steering member is duplicated by the slidable plate, and a plurality of rotatable spindles disposed adjacent to said slidable plate and adapted to cooperate therewith to operate upon a piece of work.

3. A pantographic machine tool, comprising a pair of plates of substantially heavy weight one slidable upon the other, a pair of equally proportioned pantographs pivotally connected to said plates and adapted to operate said slidable plate, a common steering member for operating said pantographs in unison, the organization being such that any movement of the steering member is duplicated by the slidable plate, a rotatable spindle disposed in juxtaposition to said slidable plate, means carried by the plate for securing a piece of work thereto, and means carried by said spindle for holding a tool in position to operate on said piece of work in response to the operation of said steering member.

In testimony whereof I have signed my name to this specification.

FRANZ PAUL HABICHT.